United States Patent  
Maki et al.

(10) Patent No.: US 6,303,762 B1
(45) Date of Patent: Oct. 16, 2001

(54) METHOD OF PRODUCING DISAZO PIGMENT

(75) Inventors: Hitoshi Maki; Hideto Noguchi; Kenji Kitamura; Masami Shirao, all of Tokyo (JP)

(73) Assignee: TOYO INK Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/827,098

(22) Filed: Apr. 6, 2001

(30) Foreign Application Priority Data

Apr. 10, 2000 (JP) .................................. 12-107463
Feb. 16, 2001 (JP) .................................. 11-039375

(51) Int. Cl.$^7$ ........................... C09B 67/20; C09B 67/22; C09D 11/02
(52) U.S. Cl. ...................... 534/747; 534/575; 106/31.81; 106/496
(58) Field of Search .................................. 534/747, 575; 106/31.81, 496

(56) References Cited

U.S. PATENT DOCUMENTS

| 3,759,731 | * | 9/1973 | Kuhne et al. ........................ 534/747 |
| 4,665,163 | * | 5/1987 | Hunger et al. ....................... 534/746 |

FOREIGN PATENT DOCUMENTS

| 45-11026 | 4/1970 | (JP) . |
| 55-10630 | 3/1980 | (JP) . |
| 55-49087 | 12/1980 | (JP) . |
| 63-72762 | 4/1988 | (JP) . |
| 63-178169 | 7/1988 | (JP) . |
| 1-110578 | 4/1989 | (JP) . |
| 1-146962 | 6/1989 | (JP) . |
| 2682749 | 8/1997 | (JP) . |
| 2943996 | 6/1999 | (JP) . |
| 2000-7931 | 1/2000 | (JP) . |
| 2000-169742 | * | 6/2000 | (JP) . |

* cited by examiner

Primary Examiner—Fiona T. Powers
(74) Attorney, Agent, or Firm—Oblon, Spivak, McClelland, Maier & Neustadt, P.C.

(57) ABSTRACT

Disclosed is a method of producing a disazo pigment, which a coupling reaction is carried out while feeding, into an acidic aqueous solution, a tetrazo aqueous solution containing a tetrazo component of benzidines and a coupler aqueous solution containing a coupling component, wherein the coupling component is a mixture comprising a main component represented by the formula (1): $CH_3COCH_2CONH-X$, wherein X represents a phenyl group optionally having one or the same or different plural substituents selected from the group consisting of a methyl group, methoxy group and chlorine atom; a first additional component represented by the formula (2): $CH_3COCH_2CONH-Y$, wherein Y represents a phenyl group having a substituent selected from the group consisting of $-CONR_2$ group, $-SO_2NR_2$ group and $-NHCOR$ group, and the phenyl group may further have a substituent selected from the group consisting of a methyl group, methoxy group, chlorine atom, $-CONR_2$ group, $-SO_2NR_2$ group and $-NHCOR$ group, and wherein Rs may be the same or different mutually, and represent a hydrogen atom, C1 to C4 alkyl group (the alkyl groups may be mutually connected to form a ring) or C1 to C4 alkylene $NR'_2$, further wherein R's represent a hydrogen atom or C1 to C4 alkyl groups which may be mutually different (the alkyl groups may be mutually connected to form a ring); and, a second additional component represented by the formula (3): $CH_3COCH_2CONH-Z$, wherein Z represents a phenyl group substituted by any one of a carboxyl group or alkali metal salts thereof, hydroxyl group or sulfonic acid group or alkali metal salts thereof, and said phenyl group may further has a substituent selected from the group consisting of a methyl group, methoxy group, chlorine atom, carboxyl group or alkali metal salts thereof, hydroxyl group or sulfonic acid group or alkali metal salts thereof. According to the method, disazo pigments can be obtained which manifest excellent transparency and flowability of the inks produced therefrom, and excellent flushing property and flushing drain coloration resistance in the pigment production process, or excellent dispersibility when ink is formed under dry condition.

10 Claims, No Drawings

METHOD OF PRODUCING DISAZO PIGMENT

BACKGROUND OF THE INVENTION

1. Field of the Invention

The present invention relates to a method of producing a disazo pigment, a disazo pigment obtained by the method, and a printing ink obtained therefrom. More particularly, the present invention relates to a method of producing a disazo pigment that can produce printing ink excellent in transparency and flowability, and excellent in flushing property and flushing drain coloration resistance when ink formation is subsequently conducted under non-dry condition, or can produce printing ink excellent in dispersibility when ink formation is subsequently conducted under dry condition, a disazo pigment produced by the method, and printing ink thereof.

2. Description of the Prior Art

Among printing industries, there have been, in recent years, very strong demands for high-speed printing to increase productivity. At present, a printing machine which is able to print around 4 meters per second is prevailing, and the demands for high speed printing are still more and more increasing. Accordingly, as a coloring material, high color strength and flowability are required for printing ink. Further, with the recent progress in graphical printing techniques, printing inks having high transparency are also asked in view of multi-color printing technique. Thus, in the recent enhanced and mass-productive printing industry, need of printing ink excellent even in flowability and transparency in addition to basic properties such as dispersibility is extremely high, and it is really one of key technologies to decide further development in the near future of printing industries.

In contrast with such a recent circumstance of printing industries, offset inks in general process publication have conventionally been obtained by a method in which an aqueous wet cake of a pigment is phase-converted by flushing with a vehicle for ink or a solvent to make ink, or a method in which a pigment obtained by drying an aqueous wet cake is dispersed by strong shearing force in a vehicle for ink.

However, in the former method, stable quality can not be easily obtained because of large influences on quality such as opacification and decrease in strength and the like due to the property lacking in stability of an aqueous wet cake itself of a pigment and to heat applied for a long period of time by poor flushing property. Further, there is a problem of coloration by mixing of a small amount of a disazo pigment component into a drain discharged in flushing.

Consequently, the latter method that can be conducted via a process less influential adversely on such qualities has so far been conducted, primarily. However, ink prepared from a dried material of an aqueous wet cake turns out to be remarkably inferior as a final ink product, in transparency, flowability and color strength as compared with ink prepared from an aqueous wet cake not dried. In the case of disazo pigments, such inferior qualities of ink prepared from a dried substance in comparison with those from a non-dried one are due to the remarkably affected crystal growth of pigment particles, exclusively, which is promoted by the heat applied during the drying process.

In the production of disazo pigments, methods based on simultaneous coupling of two components have conventionally been known. For example, Japanese Patent Application Published (JP-B) No. 55-10630 discloses a method of mixed coupling of acetoacetanilide and a second coupling component having a polar group substituted on its phenyl group. Japanese Patent Application Laid-Open (JP-A) No. 1-110578 discloses a method of coupling a mixture of two or more compounds selected from acetoacetanilide, acetoaceto-o-anisidide, acetoaceto-o-toluidide, acetoaceto-o-chloroanilide, acetoaceto-2,4-xylidide and acetoaceto-2,5-dimethoxy-4-chloroanilide. However, in any of these methods, qualities of ink made from a dried substance of a produced disazo pigment are remarkably inferior in view of transparency, flowability and color strength to those of ink made from a wet cake.

Continuous investigations have been made also on improvement of qualities of ink made from a wet cake. For example, Japanese Patent Application Published (JP-B) No. 45-11026 discloses a method of mixing a disazo pigment with a sulfonic acid compound thereof. Japanese Patent Application Published (JP-B) No. 55-49087 discloses a method using a mixture, as a coupling component, of a polar coupling component having a carboxyl group and/or sulfonic acid group and a non-polar coupling component. Japanese Patent Application Laid-Open (JP-A) Nos. 63-72762 and 63-178169 both disclose an asymmetric disazo compound comprising a polar coupling component and a non-polar coupling component.

Further, recently, Japanese Patent Official Gazette No. 2682749 discloses a method of producing a disazo pigment using, as a coupling component, a mixture of 2 to 40 mol % of acetoacetic acid-m-xylidide, 97.9 to 60 mol % of acetoacetic acid-o-toluidide and 0.1 to 10 mol % of 2-acetoacetaminobenzoic acid. However, it has been known that these coupling components show solubility in water, consequently, flushing is extremely delayed, resulting in growth of crystals owing to heat history of a long period of time, change of hue, and opacification.

Japanese Patent Official Gazette No. 2943996 (filed as an International Patent Application PCT/JP97/00547, Publication No.WO97/31067) discloses a method of coupling a non-polar coupling component and a tetrazo component of benzidines. However, in this method, which uses a single coupling component, basic problems present at a microscopic level such as crystal growth are not solved, and there is no other evaluation than the evaluation that the resulting ink's performance is not sufficient yet.

Additionally, there is also known a method in which the surface of a pigment composition is coated with rosins and a vehicle for printing ink to impart various resistances and suitability to the pigment composition. However, this method does not improve basic abilities of the pigment composition before coating, and the coating material does not have so high effect as to compensate low abilities of the pigment composition itself. For example, Japanese Patent Application Laid-Open (JP-A) No. 1-146962 discloses a method of surface-treating an organic pigment using a dispersing aid composed of a resin, rosin, aluminum resinate, aluminum rosinate or a mixture thereof. However, the amount of this dispersing aid used is as extremely high as 50 to 100 mol % based on the organic pigment, namely, dilution is effected by the dispersing aid and increase in dispersing ability is not admitted from the standpoint of a usual pigment composition, though the dispersing aid contributes to improvement in color developing property from the standpoint of ability per coloring matter equivalent.

SUMMARY OF THE INVENTION

The present inventors have continued intensive study heretofore, and resultantly found that the above-mentioned problems can be simultaneously solved by using as coupling components, in addition to a main component, specific two coupling components together, namely, by allowing these two components to be admixed with the main component at a molecular level and simultaneously to be in contact with a tetrazo component in a coupling reaction, and by progressing the reaction, as described in detail below.

Thus, the present invention is a method of producing a disazo pigment, in which a coupling reaction is carried out while feeding, into an acidic aqueous solution, a tetrazo aqueous solution containing a tetrazo component of benzidines and a coupler aqueous solution containing a coupling component, wherein the coupling component is a mixture comprising a main component represented by the formula (1):

$$CH_3COCH_2CONH\text{—}X \quad (1)$$

wherein X represents a phenyl group optionally having one or the same or different plural substituents selected from the group consisting of a methyl group, methoxy group and chlorine atom;

a first additional component represented by the formula (2):

$$CH_3COCH_2CONH\text{—}Y \quad (2)$$

wherein Y represents a phenyl group having a substituent selected from the group consisting of —$CONR_2$ group, —$SO_2NR_2$ group and —NHCOR group, and the phenyl group may further have a substituent selected from the group consisting of a methyl group, methoxy group, chlorine atom, —$CONR_2$ group, —$SO_2NR_2$ group and —NHCOR group, and wherein Rs may be the same or different mutually, and represent a hydrogen atom, C1 to C4 alkyl group (the alkyl groups may be mutually connected to form a ring) or C1 to C4 alkylene $NR'_2$, further wherein R's represent a hydrogen atom or C1 to C4 alkyl groups which may be mutually different (the alkyl groups may be mutually connected to form a ring); and, a second additional component represented by the formula (3):

$$CH_3COCH_2CONH\text{—}Z \quad (3)$$

wherein Z represents a phenyl group substituted by any one of a carboxyl group or alkali metal salts thereof, hydroxyl group or sulfonic acid group or alkali metal salts thereof, and said phenyl group may further has a substituent selected from the group consisting of a methyl group, methoxy group, chlorine atom, carboxyl group or alkali metal salts thereof, hydroxyl group or sulfonic acid group or alkali metal salts thereof.

In the pigment synthesis method of the present invention, a plurality of disazo pigment molecules can be simultaneously produced such as a disazo compound containing a non-polar coupler of the general formula (2) and a polar coupling component of the general formula (3), a symmetric disazo compound containing only a non-polar coupling component of the general formula (1), and the like. Not only a disazo compound comprising a polar coupling component of the general formula (3), but also a disazo compound comprising a polar coupling component of the general formula (1) and a polar coupling component of the general formula (2), and a disazo compound comprising a polar coupling component of the general formula (2) and a polar coupling component of the general formula (3), can also be present. These plural types of disazo compound molecules are adsorbed on and/or incorporated in, each other, in the crystallization process of the disazo pigment.

By the method of the present invention, each pigment particle comes to be constituted of various types of pigment molecule, each type being originated from a different combination of two out of three coupling components used. Although further deliberate investigation will be necessary in the future, it is supposed based on the present understanding of the inventors that due to some appropriate balance between polar parts and non-polar parts of pigment particles obtained, (1) the crystal growth as above mentioned is suppressed moderately during the drying process and also in heating during the flushing process, and simultaneously, (2) phenomena intrinsic in a mixed colorant system, which are liable to occur when a plurality of pigments are compounded merely as a mixture and lead to a reduction in qualities of the pigment such as color separation, can also be avoided.

The method of the present invention is preferably carried out in a manner such that the coupling component is not substantially deposited in the reaction system and the tetrazo component immediately reacts with the coupling component after fed. As one method for this, desirable is a constitution of reaction system in which a coupler aqueous solution and a tetrazo aqueous solution are injected into the above-mentioned acidic aqueous solution concurrently, from separately set respective feeders such as injecting tubes.

A coupling reaction can generally proceed in a weak acid aqueous solution at a low temperature, but solubility of a coupling component is considerably low in a weak acid solution. Therefore, in the conventional acid deposition method in which a tetrazo component is injected in a weak acid solution where a coupling component has been precipitated in advance, most part of the coupling component are present as aggregates in the reaction solution. The coupling reaction proceeds as a liquid/solid reaction between each of coupler particles (aggregates) and the tetrazo component dissolved in the solution, accordingly. Therefore, with the progress of coupling reaction, proceeding of dissolution of the solid coupler into the reaction solution may become insufficient, the amount of coupling component dissolved in the aqueous solution decreases, and as a result, coupling reaction proceeds near or on the surface of the coupler particles. In such a case that is likely to occur in the situation aforementioned, pigment materials generated from the reaction may cover the not-yet-dissolved and thus non-reacted coupler particle surface and therefore the dissolution of the coupler or the coupling reaction itself is prohibited afterward.

Within the typically conducted reaction technique, therefore, drawbacks such as decrease in yield and adverse effect of non-reacted coupler residue on pigment properties are likely not to be avoided as described in Japanese Patent Official Gazette No.2943996. Additionally, some orientation phenomena of each of the coupling component molecule in the aqueous reaction solution as well as orientation and/or heterogeneous distribution of each component molecule in the aggregates are expected to occur, if based on the typical solid-liquid reaction above-mentioned, due to the difference in polarity between the three different types of coupling component. It is supposed that such orientations and heterogeneous distributions lead to the unfavorable situation that each different pigment molecule supposed to be derived freely from each combination of different or same coupling components (1), (2) and (3) cannot be formed freely as mentioned above.

Supply of polarity and non-polarity, and randomization or equalized opportunity of their distribution into the pigment molecules and crystals will be both achieved by making the coupling component a three-component system, and by adopting the preferable concurrent injection process as aforementioned, respectively, and thus the effect of three-component coupling of the present invention can be fully displayed.

By comparing each example with the corresponding comparative example (a) wherein the coupling component was of the 3-components system and the reaction process was by the typical acid deposition method, and with another corresponding comparative example (b) wherein the coupling component was only a main component and the reaction process was a process according to the preferable concurrent injection, the superiority of such a specific constitution of the present invention will be clearly appreciated.

In the method of the present invention, the molar ratio of the total amount of the first and the second additional components to the amount of the main component is preferably within the range from 99:1 to 70:30. The molar ratio of the first additional component to the second additional component is preferably within the range from 1:9 to 9:1. The coupler aqueous solution and the tetrazo aqueous solution are preferably fed into the acidic aqueous solution in a manner such that the ratio of the molar feeding rate of the coupling component to the molar feeding rate of the tetrazo component is within the range from 200:80 to 200:99.

The method of the present invention may further comprise adding a water-soluble inorganic salt to an aqueous disazo pigment slurry obtained from the coupling reaction. Also, the method may further comprise surface treating a disazo pigment material obtained from said coupling reaction with rosins or a vehicle for printing ink.

The present invention also includes, within the scope, a disazo pigment obtained by the method, and a printing ink composition that comprises a vehicle for printing ink and a disazo pigment obtained by the method.

A disazo pigment produced by the method of the present invention manifests, as described in detail below by way of examples, remarkably excellent properties such as flowability and transparency of the ink produced, flushing property in production, flushing drain coloring resistance, and dispersibility.

DETAILED DESCRIPTION OF THE INVENTION

A coupling component of the general formula (1) in the present invention may be a general coupling component that can be coupled with a tetrazo component comprising benzidines to form a yellow compound and is not specifically limited. Examples thereof include acetoacetanilide, acetoaceto-o-toluidide, acetoaceto-p-toluidide, acetoaceto-o-xylidide, acetoaceto-m-xylidide, acetoaceto-p-xylidide, acetoaceto-o-xylidide, acetoaceto-o-methoxyanilide, acetoaceto-m-methoxyanilide, acetoaceto-p-methoxyanilide, acetoaceto-2,4-dimethoxyanilide, acetoaceto-2,5-dimethoxyanilide, acetoaceto-2,3-dimethoxy-4-chloroanilide, acetoaceto-2,3-dimethoxy-5-chloroanilide, acetoaceto-2,4-dimethoxy-5-chloroanilide, acetoaceto-2,5-dimethoxy-3-chloroanilide, acctoaceto-2,5-dimethoxy-4-chloroanilide, acetoaceto-o-chloroanilide, acetoaceto-p-chloroanilide.

In the present invention, —$CONR_2$ group that is a substituent on a phenyl group in a coupling component represented by the general formula (2) is the one that comes into the category generally called carbonamide groups or alkylcarbamoyl groups. Herein, Rs may be the same or different mutually, and each represents a hydrogen atom, C1 to C4 alkyl group or C1 to C4 alkylene $NR'_2$. R' represents a hydrogen atom or a C1 to C4 alkyl group, two of which may be different mutually. Each of Rs and R's may take a structure in which two alkyl groups, both bonding to the same nitrogen atom, are connected each other so as to form a ring.

—$SO_2NR_2$ group which is a substituent on a phenyl group in a coupling component represented by the general formula (2) is the one that comes into the category generally called sulfonamide groups or alkylsulfamoyl groups. Herein, R has the same meaning as described above. —NHCOR group which is a substituent on a phenyl group in a coupling component represented by the general formula (2) is the one that comes into the category generally called alkanoylamino groups. Herein, R has the same meaning as described above.

More specifically, examples of a non-polar coupling component of the general formula (2) include acetoaceto-o-carbamoylanilide, acetoaceto-p-carbamoylanilide, acetoaceto-m-methylaminocarboxyanilide, acetoaceto-p-ethylaminocarbox yanilide, acetoaceto-p-dimethylaminocarboxyanilide, acetoaceto-m-diethylaminocarboxyanilide, acetoaceto-m-dibutylaminocarboxyanilide, acetoaceto-m-dimethylaminomethylaminocarboxyanilide, acetoaceto-p-dimethylaminoethylaminocarboxyanilide, acetoaceto-p-dimethylaminopropylaminocarboxyanilide, acetoaceto-p-diethylaminopropylaminocarboxyanilide, acetoaceto-m-dipropylaminomethylaminocarboxyanilide, acetoaceto-p-sulfamoylanilide, acetoaceto-p-methylaminosulfonylanilide, acetoaceto-p-propylaminosulfonylanilide, acetoaceto-p-diethylaminosulfonylanilide, acetoaceto-p-dimethylaminomethylaminosulfonylanilide, acetoaceto-p-dimethylaminopropylaminosulfonylanilide, acetoaceto-2-methyl-5-carbamoylanilide, acetoaceto-p-methylcarbamoylanilide, acetoaceto-2,5-dimethyl-4-carbamoylanilide, acetoaceto-2-methoxy-4-carbamoylanilide, acetoaceto-2,5-dimethoxy-4-carbamoylanilide, acetoaceto-2-chloro-4-carbamoylanilide, acetoaceto-p-acetamideanilide, acetoaceto-2-chloro-4-acetamideanilide, acetoaceto-2-methoxy-4-acetamideanilide.

In the coupling component of general formula (3), the phenyl group is substituted by at least one of a carboxyl group or alkali metal salts thereof, a hydroxyl group, a sulfonic group or alkaline metal salts thereof, to give a polar acetanilide type compound, in contrast to the terminal phenyl group in the coupling component represented by general formula (1). The phenyl group may further have one, or the same or different substituents selected from the group consisting of a methyl group, methoxy group, chlorine atom, carboxyl group or alkali metal salts thereof, hydroxyl group, and sulfonic group or alkali metal salts thereof. More specifically, examples of the coupling compound of general formula (3) include 4-acetoacetylaminobenzenesulfonic acid, 4-acetoacetylamino-2-methylbenzenesulfonic acid, 2-acetoacetylamino-3-chloro-4-methylbenzenesulfonic acid, 4-acetoacetylamino-3-methoxy-2-methylbenzenesulfonic acid, 2-acetoacetylamino-5-methoxy-4-methylbenzenesulfonic acid, 2-acetoacetylamino-3,5-dichlorobenzenesulfonic acid, 2-acetoacetylaminobenzoic acid, 2-acetoacetylamino-4-chlorobenzoic acid, 2-acetoacetylaminoterephthalic acid, 3-acetoacetylamino-6-hydroxybenzoic acid, 3-acetoacetylamino-6-methoxybenzoic acid, 2-acetoacetylaminophenol, and alkali metal salts thereof.

The aqueous solution of a coupling component used in the present invention contains a compound of general formula (1) and a compound of general formula (2) which are non-polar coupling components, and a compound of general formula (3) which is a polar coupling component. This aqueous solution of coupling components is preferably an alkali solution, which can dissolve all coupling components. As the alkali, for example, inorganic bases such as sodium hydroxide, potassium hydroxide and the like are listed.

The tetrazo aqueous solution according to the present invention contains a tetrazo compound obtained by tetrazotizing benzidines by known methods. As benzidines, for example, derivatives of benzidine such as 3,3'-dichlorobenzidine, 2,2',5,5'-tetrachlorobenzidine, and 3,3'-dimethoxybenzidine and the like are listed. The tetrazo aqueous solution containing a tetrazo component of benzidines is preferably an acidic aqueous solution, and particularly, an aqueous solution acidified with hydrochloric acid is preferably used. A combination is preferable in which the above-mentioned aqueous solution of coupling components is an alkali solution and the aqueous solution of a tetrazo component is an acidic solution.

In the present invention, it is preferable that the molar ratio of the total amount of a coupling component of the general formula (2) and a coupling component of the general formula (3) to the amount of a coupling component of the general formula (1) is within the range between 99:1 and 70:30. Further, it is preferable that the molar ratio of a coupling component of the general formula (2) to a coupling component of the general formula (3) is within the range between 1:9 and 9:1. If the amount of a coupling component of the general formula (3) is less than the above-mentioned value, transparency and clearness decease, while if the above-mentioned value, flushing suitability decreases.

In the present invention, an acidic aqueous solution into which a coupler aqueous solution and a tetrazo aqueous solution are to be injected is previously charged in a vessel for reaction. The vessel may be, typically, a batch type stirring vessel. As the batch type stirring vessel, any of known vessels may be used. It is also, typically, necessary that the vessel is constituted of a water vessel for keeping liquid mediums which are required to be added to the water vessel for each liquid medium requiring stirring, and a stirring machine having a stirring blade to stir the liquid medium. An acidic solution in the batch type stirring vessel may advantageously be one which can maintain the coupling reaction system in the pH range from 3 to 6.9, preferably in the pH range from 3.5 to 6.3. For this purpose, known acid aqueous solutions used in conventional coupling methods, for example, aqueous solutions of acetic acid, formic acid and the like can be used.

Maintaining pH in the above-mentioned range is preferable for minimizing sub-reactions such as decomposition and concentration of a tetrazo component, and the like, and maintaining pH in the above-mentioned range from the initiation of the reaction to completion of the reaction is more preferable. For this, it is preferable to allow a pH buffer to be present in an acidic aqueous solution in the batch type stirring vessel, though an acid or alkali may also be added intermittently or continuously during the reaction. From the standpoint of easiness of operation, it is preferable to use an aqueous solution system having pH buffering property, for example, buffering aqueous solutions such as "acetic acid-sodium acetate" system, "formic acid-sodium formate" system and the like which are often used in conventional coupling reactions because then variation of pH is little and maintenance of pH becomes easier.

In the present invention, injection of a coupler aqueous solution and a tetrazo aqueous solution containing a tetrazo component of benzidines into an acidic aqueous solution in a batch type stirring vessel can be conducted, for example, simultaneously through separate injecting tubes into the acidic aqueous solution.

For uniform adsorption of disazo compounds containing all coupling components used in the present invention on primary particles of a disazo pigment, or inclusion of such a disazo compound in a crystal structure, it will be advantageous that the compound is injected concurrently into the acidic aqueous solution so that any of the coupling components is not deposited in the reaction system and an unreacted tetrazo component immediately reacts as described above. More specifically, for example, in injecting a coupler aqueous solution and a tetrazo aqueous solution into an acidic aqueous solution, injection time ranges of these aqueous solutions is so controlled that they are at least partially overlapped. For instance, injection time ranges of both aqueous solutions may be partially overlapped, or the whole ranges of them may be overlapped, namely, same each other. If necessary, some time may exist, during which only one solution, either a coupler solution or tetrazo solution, is injected.

If a coupler aqueous solution and a tetrazo aqueous solution are in direct contact, the coupling components will be deposited to give solid. As a consequence, the produced amount of disazo compounds that have, if sufficiently synthesized, the effects to improve transparency and flowability of the ink produced, flushing suitability, drain coloring resistance and dispersibility during the synthesis process, will decrease. In such a case, therefore, these properties are likely not to be improved as expected in the present invention.

To avoid this, it is preferable that in a vessel equipped with a batch type stirring machine filled with an acidic aqueous solution, injecting tube outlets are provided on positions distant each other, and injection is conducted (herein referred to as simultaneous injection, or concurrent injection or feeding), stirring is effected sufficiently, and a tetrazo component and coupling components are reacted assuredly in an acidic aqueous solution. Further, it may also be permissible that an acidic aqueous solution is extracted from a stirring vessel and allowed to circulate through outside portions, and the tetrazo aqueous solution and coupler aqueous solution are injected into this circulating line, or one of them is injected into the circulating line and other is injected into the stirring vessel.

In the present invention, the ratio of the molar injecting rate of all coupling components to the molar injecting rate of a tetrazo component is not particularly restricted, and usually, it is preferable that they are continuously injected so that the ratio is within the range from 200:80 to 200:99, preferably from 200:90 to 200:99 to cause a coupling reaction. By this, after injecting into an acidic aqueous solution, the whole portion of a tetrazo component is immediately reacted with coupling components, and no unreacted tetrazo component remain in the reaction system. As a result, sub-reactions due to decomposition and concentration of a tetrazo component are prevented, and color hue staining is prevented.

The ratio of molar injecting rates is not required to be maintained at a constant value through the whole period of the reaction, and may also be changed with the progress of injection in the above-mentioned range of the molar injecting rate ratio. Further, initiation of injection of a coupler aqueous solution may also be effected before the injection of a tetrazo aqueous solution. Further, it may also be permissible that surface treating agents such as nonionic surfactants, anionic surfactants and rosin solutions are injected and surface treatment of the produced pigment particles can be effected simultaneously. As such activating agents, Emulgen 120 (trade name, manufactured by Kao Corp.), Aromox DMC-W (trade name, manufactured by Lion Corp.) and the like are exemplified. Though an effect is obtained even if the amount of surfactants to be added is small, an effect is larger when the amount is larger to a certain extent. When surfactants are used, the amount thereof is determined in view of also cost, quality of a product and properties of printing ink used, in addition to reaction rate required, and generally, surfactants can be used in an amount from 0.2 to 10.0% by weight based on a pigment produced as an effective component.

As described above, if a tetrazo component and coupling components are simultaneously injected at the above-mentioned molar rate ratio, no tetrazo component is present at all in the reaction system at the completion of injection, coupling components which can cause reaction are remain in a small amount. Then, it is possible that a coupler aqueous solution containing all coupling components in admixture, and a tetrazo aqueous solution containing a teterazo component of benzidines are injected continuously into an acidic aqueous solution, then, the tetrazo aqueous solution is only injected additionally. For example, it is also possible that after the completion of simultaneous injection, a tetrazo aqueous solution is only injected additionally, allowed to react completely with coupling components, to further enhance the coupling reaction rate.

In the present invention, it is preferable to select appropriate conditions for injecting a coupler aqueous solution containing all coupling components in admixture into an acidic aqueous solution so that when the coupler aqueous solution is mixed with the acidic aqueous solution, particularly a non-polar coupling component of the general formula (2) and a polar coupling component of the general formula (3) dissolved are not deposited. This is varied depending on a lot of factors such as kinds of a non-polar coupling component and a polar coupling component to be reacted, the concentration of a coupler aqueous solution, injecting speed, pH and amount of an acidic aqueous solution, and is determined in view of the coupling rate of a coupler aqueous solution with a tetrazo aqueous solution, the scattering rate and solubility in an acidic aqueous solution, and the like. Further, the optimum injection amount of a coupler can also be determined experimentally.

In the present invention, it is preferable to pour a coupler aqueous solution having the total concentration of all coupling components from 0.1 to 1.0 mol/liter and a tetrazo aqueous solution having a concentration from 0.05 to 0.8 mol/liter into an acidic aqueous solution from the standpoint of operation, economy and small load. The amount of injecting per unit time of a coupler aqueous solution and a tetrazo aqueous solution into an acidic aqueous solution is not particularly restricted, and is determined in the range wherein a coupling component is not deposited in an acidic aqueous solution.

The range in which all coupling components are not deposited varies depending on various conditions such as the kind, pH, amount and stirred condition of an acidic aqueous solution, position of an outlet of a injecting tube, and the like, and the injecting amount is determined from general opinions in view of time required for production, production process, and the like. Namely, when the injecting amount of a coupler aqueous solution into an acidic aqueous solution is smaller, all coupling components are not deposited easily, however, the concentration in the reaction system decreases, leading to longer time for production of a pigment product. The ratio of the injection amount of a coupler aqueous solution to the injection amount of a tetrazo aqueous solution into an acidic aqueous solution per unit time is preferably within the range from 100:1 to 1000:50.

In the present invention, reaction conditions such as temperature and pH in coupling and method of controlling this are selected from conventional known conditions in coupling and controlling methods, and there is no specific restriction. pH and temperature may be changed with time or injecting amount, or may be maintained constant throughout the reaction.

When the present invention is effected in preferable embodiments, since an acidic tetrazo aqueous solution and an alkaline coupler aqueous solution are injected simultaneously, a coupling reaction can be conducted while maintaining the initial pH until the end by controlling pH and flow rate of the solutions so that acids and alkalis in these aqueous solutions are neutralized. The method of producing a pigment of the present invention is particularly effective for obtaining C.I. Pigment Yellow 12, 13, 14, 17 and 83 surface-treated with a pigment derivative.

The pigment of the present invention preferably contains 98.0 to 70.0% of a disazo compound containing per one molecule two coupling components of the general formula (1) and 2.0 to 30.0% of a disazo compound containing per one molecule one or two coupling components of the general formula (2) and/or coupling components of the general formula (3), depending on the compounding ratio of coupling components previously controlled. A disazo pigment in thus obtained acidic aqueous solution can be removed out from the reaction system by continuous solid-liquid separation, or be removed out from the reaction system by batch-wise solid-liquid separation after completion of the reaction.

For improving pigment properties of a disazo pigment in the present invention, a water-soluble inorganic salt selected from aluminum sulfate, aluminum chloride and calcium chloride may be added to aqueous slurry of a disazo pigment, or surface treatment of a pigment may be performed with rosins or vehicles for printing ink. As the rosins for surface treatment, there are listed a sodium hydroxide solution and potassium hydroxide solution and the like of rosins usually used for rosin-treatment of pigment such as gum rosin, wood rosin, tall oil rosin, disproportionated rosin, polymerized rosin, hydrogenated rosin, maleated rosin, and the like. As the vehicle for printing ink for surface treatment, a rosin-modified phenol resin which has high acidic value and becomes an alkali aqueous solution is preferable, and an alkyd resin, petroleum resin and the like may also be used together with the rosin-modified phenol resin. The amount of the rosin or vehicle for printing ink added is from 2 to 150% by weight, preferably from 3 to 80% by weight based on a disazo pigment produced by coupling in terms of solid content.

A disazo pigment composition obtained by the production method of the present invention can be kneaded with a vehicle for printing ink and used in printing ink excellent in transparency and flowability. A vehicle for offset ink is composed, for example, of a resin such as a rosin-modified phenol resin, petroleum resin, alkyd resin or dry oil-modified resin thereof, and if necessary, a vegetable oil such as linseed oil, tung oil, soybean oil or the like, and a solvent such as n-paraffin, isoparaffin, aromatic, naphthene, ?-olefin and the like. A mixing ratio of resin, vegetable oil, and solvent is preferably, in this order, 20–50:0–30:10–60 by weight. A vehicle for offset ink containing the disazo pigment compounded of the present invention can be made into printing ink by appropriate compounding of known additives such as an ink solvent, drier, leveling improver, thickening agent and the like, if necessary.

A vehicle for gravure ink is composed, for example, of a resin mixture such as gum rosin, wood rosin, tall oil rosin, calcificated rosin, lime rosin, rosin ester, maleic acid resin, gilsonite, dammar, shellac, polyamide resin, vinyl resin, nitrocellulose, cyclorubber, chlorinated rubber, ethylcellulose, cellulose acetate, ethylene-vinyl acetate copolymer resin, urethane resin, polyester resin, alkyd resin and the like, and a solvent such as n-hexane, toluene, methanol, ethanol, acetone, ethyl acetate, ethyl lactate, ethylene glycol monoethyl ether, ethylene glycol monomethyl ether, ethylene glycol monobutyl ether, isopropyl alcohol, chlorobenzol, ethyl ether, methyl ethyl ketone, ethyl acetoacetate, and the like. A compounding ratio of a resin mixture to a solvent is preferably 10–50:30–80, by weight. A vehicle for gravure ink containing the disazo pigment compounded of the present invention can be made into printing ink by appropriate compounding of known additives such as a plasticizer, ultraviolet ray inhibitor, antioxidant, antistatic agent and the like as auxiliaries, in addition to extenders such as barium sulfate, barium carbonate, calcium carbonate, gypsum, alumina white clay, silica, silica white, talc, calcium silicate, precipitated magnesium carbonate and the like, if necessary.

EXAMPLES

The examples describe the present invention further specifically below, but do not limit the scope of the present invention. "Parts" and "%" in the examples mean "parts by weight" and "% by weight" unless otherwise stated.

Each of comparative examples (a) such as 1a, 2a, and so on is the case wherein the coupling component was the same as that of the corresponding example, and by means of the acid deposition process. Each of comparative examples (b) such as 1b, 2b, and so on is the case wherein the coupling component was of only a main component, and by means of concurrent injection procedure. Each of comparative examples (c) such as 1c, 2c, and so on is the case wherein the coupling component including, as an additional component, only a component expressed in formula (3), was used, and by means of concurrent injection procedure. Finally, Each of comparative examples (d) is the case wherein the coupling component including, as an additional component, only a component expressed in formula (2), was used, and by means of concurrent injection procedure.

In Example 4, a heat treatment was done after a rosin treatment whereas in other examples a heating treatment was done before the rosin treatment to extend pigment particles. According to the reversed procedure, further modification of crystal growth characteristics, transparency of the ink produced, etc. are expected as well as flowability being varied, by enhancing the surface treatment effect through making an agent like rosin permeate into the pigment particles.

Example 1

3,3'-dichlorobenzidine hydrochloride was tetrazotized according to an ordinary method using 3-fold mol of hydrochloric acid and 2-fold mol of sodium nitrite to prepare a 0.125 mol/l tetrazo aqueous solution of 10° C. 325.7 parts of acetoacetanilide, 6.6 parts of 2-acetoacetylaminobenzoic acid, 9.5 parts of 2-hydroxy-5-acetoacetylbenzoic acid and 19.8 parts of acetoaceto-p-carbamoylanilide were dissolved in an aqueous solution containing 120 parts of sodium hydroxide to prepare a 0.259 mol/l coupler aqueous solution of 25° C.

As a buffer solution, 5000 parts of an acidic aqueous solution of 24° C. having a pH of 4.7 composed of 300 parts of 80% acetic acid, 80 parts of sodium hydroxide and water was prepared, and this was charged into a reactor equipped with a stirring machine. Two injecting tubes having outlets at positions remote each other in this pH buffer solution were set on this reactor, and the tetrazo aqueous solution and the coupler solution were injected into the pH buffer solution through the injecting tubes, respectively. Injections of these solutions were initiated simultaneously, and injected for 40 minutes at the same volume flow rate (193 ml/min.) using constant flow pumps, and the injections were completed at the same time. During the injection, a tetrazo was not detected from a reaction solution collected from the liquid surface. Yield of the coupling reaction on a coupler basis at this completion of injection was 96.5%.

Then, only the tetrazo aqueous solution was additionally injected until a trace amount of the tetrazo was recognized in the reaction system, and as a result, yield of the coupling reaction on a coupler basis was 98.6%. Detection of tetrazo was conducted by color development reaction using β-naphthol. Yield rate of coupling reaction was determined from the amount of unreacted coupler obtained by the analysis of liquid chromatography.

The slurry obtained from the above-mentioned process was heated up to 60° C., then, to this was added an aqueous sodium hydroxide solution to control the pH to 10.5, and tall oil-based rosin soap was added in an amount of 31 parts in terms of solid, then, pH was controlled to 6.5 with an aqueous hydrochloric acid solution. Further, 70 parts of 8% aqueous aluminum sulfate solution were added, then, the solution was filtrated and purified to obtain a wet pigment composition (Sample 1) containing a disazo pigment.

Comparative Example 1a

A tetrazo aqueous solution was prepared in the same manner as in Example 1. 0.259 mol/l coupler aqueous solution of 25° C. was prepared in the same manner as in Example 1 except that the amount of sodium hydroxide used was changed to 144 parts.

As a buffer solution, 5000 parts of an acetic acid solution composed of 300 parts of 80% acetic acid and water were prepared, and this was charged into a reactor equipped with a stirring machine. The coupler aqueous solution was injected at a flow rate of 193 ml/min. for 40 minutes into this acetic acid solution, to deposit the coupler. An injecting tube having an outlet in this coupler slurry was set on the reactor, and the tetrazo aqueous solution was injected at a flow rate of 184 ml/min. through this injecting tube. This injection was conducted until a trace amount of a tetrazo was detected at the reaction liquid surface. Yield of the coupling reaction was 92.1%.

The slurry obtained by the above-mentioned process was subjected to heating, rosin treatment, filtration and purification in the same manners as in Example 1 to obtain a wet pigment composition (Sample 1a) containing a disazo pigment.

Comparative Example 1b

Preparations of a tetrazo aqueous solution and a buffer solution and its injection into a reactor were conducted in the same manner as in Example 1 except that 354 parts of acetoacetanilide was dissolved in an aqueous solution containing 120 parts of sodium hydroxide to prepare a 0.259 mol/l coupler aqueous solution of 25° C.

During the injection, tetrazo was not detected in the reaction solution collected from the liquid surface. Yield of the coupling reaction on a coupler basis at this completion of injection was 96.5%. Then, only the tetrazo aqueous solution was additionally injected until a trace amount of a tetrazo was recognized in the reaction system, and as a result, yield of the coupling reaction on a coupler basis was 98.6%.

The slurry obtained by the above-mentioned process was subjected to heating, rosin treatment, filtration and purification in the same manners as in Example 1 to obtain a wet pigment composition (Sample 1b) containing a disazo pigment. This pigment corresponds to a pigment described in Japanese Patent Official Gazette No. 2943996.

Comparative Example 1c

Preparations of a tetrazo aqueous solution and a buffer solution and its injection into a reactor were conducted in the same manner as in Example 1 except that 325.7 parts of acetoacetanilide and 35.4 parts of 3-acetoacetylaminobenzoic acid were dissolved in an aqueous solution containing 120 parts of sodium hydroxide to prepare a 0.259 mol/l coupler aqueous solution of 25° C.

During the injection, tetrazo was not detected in a reaction solution collected from the liquid surface. Yield of the coupling reaction on a coupler basis at this completion of injection was 96.5%. Then, only the tetrazo aqueous solution was additionally injected until a trace amount of a tetrazo was recognized in the reaction system, and as a result, yield of the coupling reaction on a coupler basis was 98.6%.

The slurry obtained by the above-mentioned process was subjected to heating, rosin treatment, filtration and purification in the same manners as in Example 1 to obtain a wet pigment composition (Sample 1c) containing a disazo pigment. This pigment corresponds to the disazo pigment composition described in Japanese Patent Application Laid-Open (JP-A) No. 2000-7931.

Comparative Example 1d

Preparations of a tetrazo aqueous solution and a buffer solution and its injection into a reactor were conducted in the same manners as in Example 1 except that 325.7 parts of acetoacetanilide and 35.2 parts of acetoaceto-p-carbamoylanilide were dissolved in an aqueous solution containing 120 parts of sodium hydroxide to prepare a 0.259 mol/l coupler aqueous solution of 25° C.

During the injection, tetrazo was not detected from the reaction solution collected from the liquid surface. Yield of the coupling reaction on a couple basis at this completion of injection was 96.5%. Then, only the tetrazo aqueous solution was additionally injected until a trace amount of a tetrazo was recognized in the reaction system. As a result, Yield of the coupling reaction on a coupler basis was 98.6%.

The slurry obtained by the above-mentioned process was subjected to heating, rosin treatment, filtration and purification in the same manners as in Example 1 to obtain a wet pigment composition (Sample 1d) containing a disazo pigment.

Ink Making 1

The wet pigment compositions obtained in Example 1 and Comparative Examples 1a–1d were used to make inks and evaluated.

Into a flusher was added 230 parts of vanish for planographic ink (manufactured by Toyo Ink Mfg. Co., Ltd., varnish containing rosin-modified phenol resin) heated to 70° C. To this was added the wet pigment composition obtained in an amount of 80 parts in terms of pigment solid content, and flushing was conducted for 20 minutes while kneading. Free water was removed, then, the flusher was heated up to 100° C. while dehydrating under decompression, to remove water. After recognizing removal of water, 250 parts of vanish for planographic ink (manufactured by Toyo Ink Mfg. Co., Ltd., varnish containing rosin-modified phenol resin) and 30 parts of a solvent for ink were added gradually to prepare ink.

Time required for separation of water was measured in producing the above-mentioned ink, and coloration degree of discharged water, transparency and flowability of inks prepared were measured. The results are shown in Table 1.
Coloration Degree of Flushing Drain A drain separated in flushing in a flusher was removed into a colorless 100 ml glass bottle, and coloration degree was compared visually based on gray scale. Turbid condition providing insufficient light transmittance was represented by 1, and utterly colorless condition was represented by 5. In this way, the results were evaluated by 5 grade evaluation criterion.
Transparency of Ink On white color developing paper on which a black band pattern had been printed using black ink, each ink prepared was developed, and the color developing condition on the black band pattern was visually observed. When ink was developed on the black band and the black band was not seen at all, the condition was judged as opaque and represented by transparency level 1. When development of the test ink on the black band was not recognized easily, the condition was judged as transparent, and represented by level 10. In this way, the results were evaluated by 10 grade evaluation criterion.
Flowability of Ink Each ink prepared of a constant volume was weighed on a spread meter, and one minute after, the distance from the center point to the flow end of the flowed ink was measured. When the measured value was larger, flowability was judged as higher. Table 1 shows each relative value represented by percentage when the measured value of the wet pigment composition of the example was 100%.

TABLE 1

| Sample No. | Flowability | Transparency | Dehydration time | Drain coloration |
| --- | --- | --- | --- | --- |
| Sample 1 | 100 | 10 | 5'50" | 5 |
| Sample 1-a | 60 | 5 | 5'30" | 5 |
| Sample 1-b | 50 | 3 | 4'30" | 5 |
| Sample 1-c | 100 | 6 | 14'50" | 1 |
| Sample 1-d | 90 | 5 | 5'20" | 5 |

Example 2

Preparations of a tetrazo aqueous solution and a buffer solution and its injection into a reactor were conducted in the same manners as in Example 1 except that 300.9 parts of acetoacetanilide, 30.9 parts of 3-acetoacetylaminobenzoic acid, 23.7 parts of 2-hydroxy-5-acetoacetylbenzoic acid and 13.2 parts of acetoaceto-p-carbamoylanilide were dissolved in an aqueous solution containing 120 parts of sodium hydroxide to prepare a 0.259 mol/l coupler aqueous solution of 25° C.

Yield of the coupling reaction at the completion of injection was 96.5%. Then, the tetrazo aqueous solution was additionally injected until a trace amount of a tetrazo was recognized in the reaction system, and as a result, yield of the coupling reaction this time on a coupler basis was 98.5%.

The slurry obtained by the above-mentioned process was subjected to heating, rosin treatment, filtration and purification in the same manners as in Example 1 to obtain a wet pigment composition (Sample 2) containing a disazo pigment.

Comparative Example 2a

Preparations of a tetrazo aqueous solution and a buffer solution were conducted and a coupling reaction was allowed to progress in a reactor in the same manners as in Comparative Example 1a except that 300.9 parts of acetoacetanilide, 30.9 parts of 3-acetoacetylaminobenzoic acid, 23.7 parts of 2-hydroxy-5-acetoacetylbenzoic acid and 13.2 parts of acetoaceto-p-carbamoylanilide were used to prepare a coupler aqueous solution, to obtain a wet pigment composition (Sample 2a) containing a disazo pigment.

Comparative Example 2b

The wet pigment composition obtained in Comparative Example 1b is called here, for convenience, a wet pigment composition (Sample 2b) of Comparative Example 2b.

Comparative Example 2c

Preparations of a tetrazo aqueous solution and a buffer solution were conducted and a coupling reaction was allowed to progress in a reactor in the same manners as in Comparative Example 1c except that 300.9 parts of acetoacetanilide, 71.1 parts of 2-hydroxy-5-acetoacetylbenzoic acid were used to prepare a coupler aqueous solution, to obtain a wet pigment composition (Sample 2c) containing a disazo pigment.

Comparative Example 2d

Preparations of a tetrazo aqueous solution and a buffer solution were conducted and a coupling reaction was allowed to progress in a reactor in the same manners as in Comparative Example 1d except that 300.9 parts of acetoacetanilide and 66.0 parts of acetoaceto-p-carbamoylanilide were used to prepare a coupler aqueous solution, to obtain a wet pigment composition (Sample 2d) containing a disazo pigment.

Ink Making 2

The wet pigment compositions obtained in Example 2 and Comparative Examples 2a–2d were used to make inks and evaluated in the same manners as in Ink making 1. The results are shown in Table 2.

TABLE 2

| Sample No. | Flowability | Transparency | Dehydration time | Drain coloration |
| --- | --- | --- | --- | --- |
| Sample 2 | 100 | 10 | 6'30" | 3 |
| Sample 2-a | 70 | 6 | 5'50" | 3 |
| Sample 2-b | 45 | 3 | 4'30" | 5 |
| Sample 2-c | 100 | 7 | 17'10" | 1 |
| Sample 2-d | 90 | 5 | 4'50" | 5 |

Example 3

Preparations of a tetrazo aqueous solution and a buffer solution and its injection into a reactor were conducted in the same manners as in Example 1 except that 325.7 parts of acetoacetanilide, 22.3 parts of sodium 4-acetoacetylaminobenzenesulfonate, and 24.4 parts of acetoaceto-p-dimethylaminopropylcarbamoylanilide were dissolved in an aqueous solution containing 120 parts of sodium hydroxide to prepare a 0.259 mol/l coupler aqueous solution of 25° C.

Yield of the coupling reaction at the completion of injection was 96.5%. Then, the tetrazo aqueous solution was additionally injected until a trace amount of a tetrazo was recognized in the reaction system, and as a result, yield of the coupling reaction on a coupler basis was 98.5%.

The slurry obtained by the above-mentioned process was subjected to heating, rosin treatment, filtration and purification in the same manners as in Example 1 to obtain a wet pigment composition (Sample 3) containing a disazo pigment.

Comparative Example 3a

A wet pigment composition (Sample 3a) containing a disazo pigment was obtained in the same manners as in Comparative Example 1a except that 325.7 parts of acetoacetanilide, 22.3 parts of sodium 4-acetoacetylaminobenzenesulfonate, and 24.4 parts of acetoaceto-p-dimethylaminopropylcarbamoylanilide were used to prepare a coupler aqueous solution.

Comparative Example 3b

The wet pigment composition obtained in Comparative Example 1b is called here, for convenience, a wet pigment composition (Sample 3b) of Comparative Example 3b.

Comparative Example 3c

A wet pigment composition (Sample 3c) containing a disazo pigment was obtained in the same manners as in Comparative Example 1c except that 325.7 parts of acetoacetanilide and 44.6 parts of sodium 4-acetoacetylaminobenzenesulfonate were used to prepare a coupler aqueous solution.

Comparative Example 3d

A wet pigment composition (Sample 3d) containing a disazo pigment was obtained in the same manners as in Comparative Example 1d except that 325.7 parts of acetoacetanilide and 48.8 parts of acetoaceto-p-dimethylaminopropylcarbamoylanilide were used to prepare a coupler aqueous solution.

Ink Making 3

The wet pigment compositions obtained in Example 3 and Comparative Examples 3a–3d were used to make inks and evaluated in the same manners as in Ink Making 1. The results are shown in Table 3.

TABLE 3

| Sample No. | Flowability | Transparency | Dehydration time | Drain coloration |
| --- | --- | --- | --- | --- |
| Sample 3 | 100 | 9 | 6'30" | 4 |
| Sample 3-a | 60 | 6 | 6'10" | 4 |
| Sample 3-b | 40 | 3 | 4'30" | 5 |
| Sample 3-c | 90 | 7 | 15'40" | 1 |
| Sample 3-d | 80 | 5 | 5'50" | 3 |

Example 4

A wet pigment composition (Sample 4) containing a disazo pigment was obtained in the same manners as in Example 1 except that after the coupling reaction, an aqueous sodium hydroxide solution was added to the resulted slurry to control pH to 10.5, and tall oil-based rosin soap was added in an amount of 31.0 parts in terms of solid content, then, 70 parts of a 8% aqueous aluminum sulfate solution was added, and pH was controlled to 6.5 with an aqueous hydrochloric acid solution, then, the mixture was heated up to 60° C.

Comparative Example 4a

A coupling reaction was conducted in the same manner as in Comparative Example 1a, then, rosin treatment and heating treatment were conducted in the procedure described in Example 4, to obtain a wet pigment composition (Sample 4a) containing a disazo pigment.

Comparative Example 4b

A coupling reaction was conducted in the same manner as in Comparative Example 1b, then, rosin treatment and heating treatment were conducted in the procedure described in Example 4, to obtain a wet pigment composition (Sample 4b) containing a disazo pigment.

Comparative Example 4c

A coupling reaction was conducted in the same manner as in Comparative Example 1c, then, rosin treatment and heating treatment were conducted in the procedure described in Example 4, to obtain a wet pigment composition (Sample 4c) containing a disazo pigment.

Comparative Example 4d

A coupling reaction was conducted in the same manner as in Comparative Example 1d, then, rosin treatment and heating treatment were conducted in the procedure described in Example 4, to obtain a wet pigment composition (Sample 4d) containing a disazo pigment.

Ink Making 4

The wet pigment compositions obtained in Example 4 and Comparative Examples 4a–4d were used to make inks and evaluated in the same manners as in Ink making 1. The results are shown in Table 4.

TABLE 4

| Sample No. | Flowability | Transparency | Dehydration time | Drain coloration |
|---|---|---|---|---|
| Sample 4 | 100 | 9 | 7'00" | 4 |
| Sample 4-a | 60 | 6 | 6'10" | 4 |
| Sample 4-b | 50 | 3 | 5'00" | 5 |
| Sample 4-c | 90 | 6 | 12'40" | 1 |
| Sample 4-d | 80 | 5 | 5'50" | 3 |

Example 5

A coupling reaction was allowed to progress in the same manner as in Example 1 except that 366.7 parts of acetoaceto-o-toluidide, 9.5 parts of 5-acetoacetylamino-2-hydroxybenzoic acid and 10.0 parts of acetoaceto-2-metboxy-4-carbamoylanilide were dissolved in an aqueous solution containing 120 parts of sodium hydroxide to prepare a 0.259 mol/l of coupler aqueous solution of 25° C.

The pigment slurry obtained was heated up to 80° C., then, subjected to rosin treatment, filtration and purification to obtain a wet pigment composition (Sample 5) containing a disazo pigment.

Comparative Example 5a

A coupling reaction was allowed to progress in the same manner as in Comparative Example 1a except that 366.7 parts of acetoaceto-o-toluidide, 9.5 parts of 5-acetoacetylamino-2-hydroxybenzoic acid and 10.0 parts of acetoaceto-2-methoxy-4-carbamoylanilide were used to prepare a coupler aqueous solution.

The pigment slurry obtained was heated up to 80° C., then, subjected to rosin treatment, filtration and purification to obtain a wet pigment composition (Sample 5a) containing a disazo pigment.

Comparative Example 5b

A coupling reaction was allowed to progress in the same manner as in Comparative Example 1b except that 382 parts of acetoaceto-o-toluidide was used instead of 354 parts of acetoacetanilide.

The pigment slurry obtained was heated up to 80° C., then, subjected to rosin treatment, filtration and purification to obtain a wet pigment composition (Sample 5b) containing a disazo pigment.

Comparative Example 5c

A coupling reaction was allowed to progress in the same manner as in Comparative Example 1c except that 366.7 parts of acetoaceto-o-toluidide and 19.0 parts of 5-acetoacetylamino-2-hydroxybenzoic acid were used to prepare a coupler aqueous solution.

The pigment slurry obtained was heated up to 80° C., then, subjected to rosin treatment, filtration and purification to obtain a wet pigment composition (Sample 5c) containing a disazo pigment.

Comparative Example 5d

A coupling reaction was allowed to progress in the same manner as in Comparative Example id except that 366.7 parts of acetoaceto-o-toluidide and 20.0 parts of acetoaceto-2-methoxy-4-carbamoylanilide were used to prepare a coupler aqueous solution.

The pigment slurry obtained was heated up to 80° C., then, subjected to rosin treatment, filtration and purification to obtain a wet pigment composition (Sample 5d) containing a disazo pigment.

Ink Making 5

The wet pigment compositions obtained in Example 5 and Comparative Examples 5a–5d were used to make inks and evaluated in the same manners as in Ink making 1. The results are shown in Table 5.

TABLE 5

| Sample No. | Flowability | Transparency | Dehydration time | Drain coloration |
|---|---|---|---|---|
| Sample 5 | 100 | 9 | 7'00" | 5 |
| Sample 5-a | 60 | 6 | 6'10" | 4 |
| Sample 5-b | 40 | 3 | 4'30" | 5 |
| Sample 5-c | 90 | 7 | 15'40" | 1 |
| Sample 5-d | 80 | 5 | 5'50" | 4 |

Example 6

A coupling reaction was allowed to progress in the same manner as in Example 1 except that 515.9 parts of acetoaceto-2,5-dimethoxy-4-chloroanilide, 11.1 parts of o-acetoacetylaminobenzoic acid and 12.7 parts of acetoaceto-2-chloro-4-carbamoylanilide were dissolved in an aqueous solution containing 120 parts of sodium hydroxide to prepare a 0.259 mol/l of coupler aqueous solution of 25° C.

The pigment slurry obtained was heated up to 80° C., then, subjected to rosin treatment, filtration and purification to obtain a wet pigment composition (Sample 6) containing a disazo pigment.

Comparative Example 6a

A coupling reaction was allowed to progress in the same manner as in Comparative Example 1a except that 515.9 parts of acetoaceto-2,5-dimethoxy-4-chloroanilide, 11.1 parts of o-acetoacetylaminobenzoic acid and 12.7 parts of acetoaceto-2-chloro-4-carbamoylanilide were used to prepare a coupler aqueous solution.

The pigment slurry obtained was heated up to 80° C., then, subjected to rosin treatment, filtration and purification to obtain a wet pigment composition (Sample 6a) containing a disazo pigment.

Comparative Example 6b

A coupling reaction was allowed to progress in the same manner as in Comparative Example 1b except that 543 parts of acetoaceto-2,5-dimethoxy-4-chloroanilide was used instead of 354 parts of acetoacetanilide.

The pigment slurry obtained was heated up to 80° C., then, subjected to rosin treatment, filtration and purification to obtain a wet pigment composition (Sample 6b) containing a disazo pigment.

Comparative Example 6c

A coupling reaction was allowed to progress in the same manner as in Comparative Example 1c except that 515.9 parts of acetoaceto-2,5-dimethoxy-4-chloroanilide and 22.2 parts of o-acetoacetylaminobenzoic acid were used to prepare a coupler aqueous solution.

The pigment slurry obtained was heated up to 80° C., then, subjected to rosin treatment, filtration and purification to obtain a wet pigment composition (Sample 6c) containing a disazo pigment.

Comparative Example 6d

A coupling reaction was allowed to progress in the same manner as in Comparative Example 1d except that 515.9 parts of acetoaceto-2,5-dimethoxy-4-chloroanilide and 25.5 parts of acetoaceto-2-chloro-4-carbamoylanilide were used to prepare a coupler aqueous solution.

The pigment slurry obtained was heated up to 80° C., then, subjected to rosin treatment, filtration and purification to obtain a wet pigment composition (Sample 6d) containing a disazo pigment.

Ink Making 6

The wet pigment compositions obtained in Example 6 and Comparative Examples 6a–6d were used to make inks and evaluated in the same manners as in Ink making 1. The results are shown in Table 6.

TABLE 6

| Sample No. | Flowability | Transparency | Dehydration time | Drain coloration |
| --- | --- | --- | --- | --- |
| Sample 6 | 100 | 9 | 7'00" | 5 |
| Sample 6-a | 60 | 6 | 6'10" | 5 |
| Sample 6-b | 50 | 3 | 5'00" | 5 |
| Sample 6-c | 90 | 6 | 12'40" | 1 |
| Sample 6-d | 80 | 5 | 5'50" | 4 |

Example 7

The wet pigment composition (Sample 1) obtained in Example 1 was dried and ground at 90° C. for 12 hours to obtain a powder pigment composition (Sample 7) containing a disazo pigment.

Comparative Example 7a

The wet pigment composition (Sample 1a) obtained in Comparative Example 1a was dried and ground at 90° C. for 12 hours to obtain a powder pigment composition (Sample 7a) containing a disazo pigment.

Comparative Example 7b

The wet pigment composition (Sample 1b) obtained in Comparative Example 1b was dried and ground at 90° C. for 12 hours to obtain a powder pigment composition (Sample 7b) containing a disazo pigment. This pigment corresponds to a pigment described in Japanese Patent No. 2943996.

Comparative Example 7c

The wet pigment composition (Sample 1c) obtained in Comparative Example 1c was dried and ground at 90° C. for 12 hours to obtain a powder pigment composition (Sample 7c) containing a disazo pigment. This pigment corresponds to a pigment described in Japanese Patent Application Laid-Open (JP-A) No. 2000-7931.

Comparative Example 7d

The wet pigment composition (Sample 1d) obtained in Comparative Example 1d was dried and ground at 90° C. for 12 hours to obtain a powder pigment composition (Sample 7d) containing a disazo pigment.

Ink Making 7

The wet pigment compositions obtained in Example 7 and Comparative Examples 7a–7d were used to make inks.

Into a stainless vessel was added 300 parts of vanish for planographic ink (manufactured by Toyo Ink Mfg. Co., Ltd., varnish containing rosin-modified phenol resin) heated to 60° C. and 100 parts of a powder pigment composition obtained, and a mill base was prepared from them using a high shearing mixer. This mill base was kneaded using triple roll. On the triple roll, 150 parts of vanish for planographic ink (manufactured by Toyo Ink Mfg. Co., Ltd., rosin-modified phenol resin) and 10 parts of a solvent for ink containing no aromatic were added to the base ink to prepare ink.

Transparency, dispersibility and flowability of the ink prepared by the above-mentioned method were measured. The results are shown in Table 7.

Dispersibility of Ink

The prepared ink was color-developed in a grind gauge, and positions on which three or more streaks appeared caused by a fraction of a pigment material that was not dispersed are represented in terms of 10 grade criterion starting from 0 in which 2.5 micron is represented by 1 unit.

TABLE 7

| Sample No. | Flowability | Transparency | Dispersibility |
|---|---|---|---|
| Sample 7 | 100 | 9 | 1 |
| Sample 7-a | 60 | 6 | 4 |
| Sample 7-b | 50 | 3 | 7 |
| Sample 7-c | 120 | 6 | 3 |
| Sample 7-d | 80 | 5 | 5 |

Example 8

The wet pigment composition (Sample 5) obtained in Example 5 was dried and ground at 90° C. for 12 hours to obtain a powder pigment composition (Sample 8) containing a disazo pigment.

Comparative Example 8a

The wet pigment composition (Sample 5a) obtained in Example 5a was dried and ground at 90° C. for 12 hours to obtain a powder pigment composition (Sample 8a) containing a disazo pigment.

Comparative Example 8b

The wet pigment composition (Sample 5b) obtained in Example 5b was dried and ground at 90° C. for 12 hours to obtain a powder pigment composition (Sample 8b) containing a disazo pigment.

Comparative Example 8c

The wet pigment composition (Sample 5c) obtained in Example 5c was dried and ground at 90° C. for 12 hours to obtain a powder pigment composition (Sample 8c) containing a disazo pigment.

Comparative Example 8d

The wet pigment composition (Sample 5d) obtained in Example 8d was dried and ground at 90° C. for 12 hours to obtain a powder pigment composition (Sample 8d) containing a disazo pigment.

Ink Making 8

The wet pigment compositions obtained in Example 8 and Comparative Examples 8a–8d were used to make inks and evaluated. The results are shown in Table 8.

TABLE 8

| Sample No. | Flowability | Transparency | Dispersibility |
|---|---|---|---|
| Sample 8 | 100 | 9 | 1 |
| Sample 8-a | 60 | 6 | 5 |
| Sample 8-b | 50 | 3 | 7 |
| Sample 8-c | 120 | 6 | 3 |
| Sample 8-d | 80 | 5 | 4 |

Example 9

A coupling reaction was allowed to progress in the same manner as in Example 7 except that 515.9 parts of acetoaceto-2,5-dimethoxy-4-chloroanilide, 11.1 parts of 2-acetoacetylaminobenzoic acid and 12.7 parts of acetoaceto-2-chloro-4-carbamoylanilide were dissolved in an aqueous solution containing 120 parts of sodium hydroxide to prepare a 0.259 mol/l of coupler aqueous solution of 25° C., which was used in this example.

The pigment slurry obtained was heated up to 80° C., then, subjected to rosin treatment, filtration and purification to obtain a wet pigment composition which was further dried and ground at 90° C. for 12 hours to obtain a powder pigment (Sample 9) containing a disazo pigment.

Comparative Example 9a

A coupling reaction was allowed to progress in the same manner as in Comparative Example 7a except that 515.9 parts of acetoaceto-2,5-dimethoxy-4-chloroanilide, 11.1 parts of 2-acetoacetylaminobenzoic acid and 12.7 parts of acetoaceto-2-chloro-4-carbamoylanilide were used to prepare a coupler aqueous solution.

The pigment slurry obtained was heated up to 80° C., then, subjected to rosin treatment, filtration and purification to obtain a wet pigment composition which was further dried and ground at 90° C. for 12 hours to obtain a powder pigment (Sample 9a) containing a disazo pigment.

Comparative Example 9b

A coupling reaction was allowed to progress in the same manner as in Comparative Example 7b except that 543 parts of acetoaceto-2,5-dimethoxy-4-chloroanilide were used instead of 354 parts of acetoacetanilide to prepare a coupler aqueous solution.

The pigment slurry obtained was heated up to 80° C., then, subjected to rosin treatment, filtration and purification to obtain a wet pigment composition which was further dried and ground at 90° C. for 12 hours to obtain a powder pigment (Sample 9b) containing a disazo pigment.

Comparative Example 9c

A coupling reaction was allowed to progress in the same manner as in Comparative Example 7c except that 515.9 parts of acetoaceto-2,5-dimethoxy-4-chloroanilide and 22.2 parts of 2-acetoacetylaminobenzoic acid were used to prepare a coupler aqueous solution.

The pigment slurry obtained was heated up to 80° C., then, subjected to rosin treatment, filtration and purification to obtain a wet pigment composition which was further dried and ground at 90° C. for 12 hours to obtain a powder pigment (Sample 9c) containing a disazo pigment.

Comparative Example 9d

A coupling reaction was allowed to progress in the same manner as in Comparative Example 7d except that 515.9 parts of acetoaceto-2,5-dimethoxy-4-chloroanilide and 25.5 parts of acetoaceto-2-chloro-4-carbamoylanilide were used to prepare a coupler aqueous solution.

The pigment slurry obtained was heated up to 80° C., then, subjected to rosin treatment, filtration and purification to obtain a wet pigment composition which was further dried and ground at 90° C. for 12 hours to obtain a powder pigment (Sample 9d) containing a disazo pigment.

Ink Making 9

The wet pigment compositions obtained in Example 9 and Comparative Examples 9a–9d were used to make inks.

20 parts of a powder pigment, 60 parts of a vehicle for gravure ink containing nitrocellulose, 80 parts of a mixed solvent (toluene:ethyl acetate:isopropyl alcohol=60:20:10) and 150 parts of alumina beads were placed in a vessel and dispersed for 60 minutes by a paint conditioner, then, 80 parts of a vehicle for gravure ink containing a polyamide resin was added to this to prepare ink.

Transparency and flowability of the ink were measured. The results are shown in Table 9.

Flowability of Ink

Flowability of the ink was measured by a Brookfield type viscometer (B type viscometer). When a measured value is lower, the flowability is better. Measured values are shown by percentage wh en a measured value of the ink prepared from a powder pigment composition of the example was represented by 100.

Transparency of Ink

Ink was color-developed on an acetate-based film using a bar coater. Black paper is laminated on the rear surface of the film, and appearance of the black paper was observed. When the black paper was not seen at all from the front side of the developed film, it was judged as opaque and visual judge was 1. When the black paper could be seen clearly, it was judged as transparent and visual judge was 10. The results are shown in terms of 10 grade criterion by such a visual judge.

TABLE 9

| Sample No. | Flowability | Transparency |
|---|---|---|
| Sample 9 | 100 | 9 |
| Sample 9-a | 155 | 6 |
| Sample 9-b | 350 | 3 |
| Sample 9-c | 110 | 8 |
| Sample 9-d | 120 | 7 |

What is claimed is:

1. A method of producing a disazo pigment, in which a coupling reaction is carried out while feeding, into an acidic aqueous solution, (a) a tetrazo aqueous solution containing a tetrazo component of benzidines and (b) a coupler aqueous solution containing a coupling component, wherein the coupling component is a mixture comprising the following components:

a main component represented by the formula (1):

$$CH_3COCH_2CONH\text{—}X \qquad (1)$$

wherein X represents a phenyl group optionally having one or the same or different plural substituents selected from the group consisting of a methyl group, methoxy group and chlorine atom;

a first additional component represented by the formula (2):

$$CH_3COCH_2CONH\text{—}Y \qquad (2)$$

wherein Y represents a phenyl group having a substituent selected from the group consisting of —$CONR_2$ group, —$SO_2NR_2$ group and —NHCOR group, and the phenyl group may further have a substituent selected from the group consisting of a methyl group, methoxy group, chlorine atom, —$CONR_2$ group, —$SO_2NR_2$ group and —NHCOR group, and wherein Rs may be the same or different mutually, and represent a hydrogen atom, C1 to C4 alkyl group (the alkyl groups may be mutually connected to form a ring) or C1 to C4 alkylene NR'$_2$, further wherein R's represent a hydrogen atom or C1 to C4 alkyl groups which may be mutually different (the alkyl groups may be mutually connected to form a ring); and, a second additional component represented by the formula (3):

$$CH_3COCH_2CONH\text{—}Z \qquad (3)$$

wherein Z represents a phenyl group substituted by any one of a carboxyl group or alkali metal salts thereof, hydroxyl group or sulfonic acid group or alkali metal salts thereof, and said phenyl group may further has a substituent selected from the group consisting of a methyl group, methoxy group, chlorine atom, carboxyl group or alkali metal salts thereof, hydroxyl group or sulfonic acid group or alkali metal salts thereof.

2. The method according to claim 1, wherein the molar ratio of the total amount of the first and the second additional components to the amount of the main component is within the range from 99:1 to 70:30.

3. The method according to claim 1, wherein the molar ratio of the first additional component to the second additional component is within the range from 1:9 to 9:1.

4. The method according to claim 1, wherein the coupler aqueous solution and the tetrazo aqueous solution are fed into the acidic aqueous solution in a manner such that the ratio of the molar feeding rate of the coupling component to the molar feeding rate of the tetrazo component is within the range from 200:80 to 200:99.

5. The method according to claim 1, further comprising adding a water-soluble inorganic salt to an aqueous disazo pigment slurry obtained from said coupling reaction.

6. The method according to claim 1, further comprising surface treating a disazo pigment material obtained from said coupling reaction with rosins or a vehicle for printing ink.

7. A disazo pigment obtained by the method of claim 1.

8. A printing ink composition comprising a vehicle for printing ink and a disazo pigment obtained by the method of claim 1.

9. The method according to claim 1, wherein said coupling reaction is carried out in a manner such that said coupling component is not substantially deposited within the acidic aqueous solution and said tetrazo component substantially immediately reacts with said coupling component.

10. The method according to claim 1, wherein said coupler aqueous solution and said tetrazo aqueous solution are concurrently fed into said acidic aqueous solution from separately set respective feeders.

* * * * *

UNITED STATES PATENT AND TRADEMARK OFFICE
CERTIFICATE OF CORRECTION

PATENT NO.   : 6,303,762 B1
DATED        : October 16, 2001
INVENTOR(S)  : Maki et al.

It is certified that error appears in the above-identified patent and that said Letters Patent is hereby corrected as shown below:

Title page,
Item [30], the Foreign Application Priority information should read:

-- [30]          Foreign Application Priority Data
Apr. 10, 2000   (JP) ................................................. 2000-107463
Feb. 16, 2001   (JP) ................................................. 2001-039375 --

Signed and Sealed this

Twenty-eighth Day of May, 2002

Attest:

*Attesting Officer*

JAMES E. ROGAN
*Director of the United States Patent and Trademark Office*